March 4, 1941.  L. ANTONELLI  2,234,103
APPARATUS FOR CHANGING THE TOOLS IN METALWORKING LATHES
Filed Feb. 6, 1939
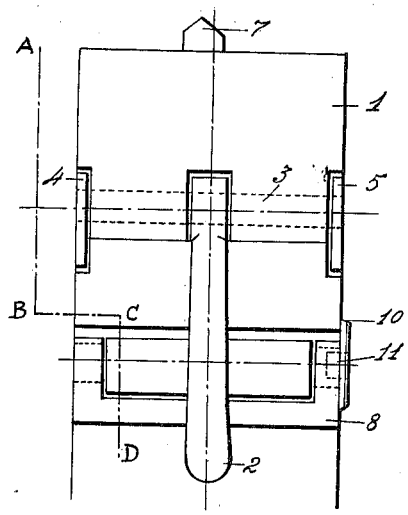
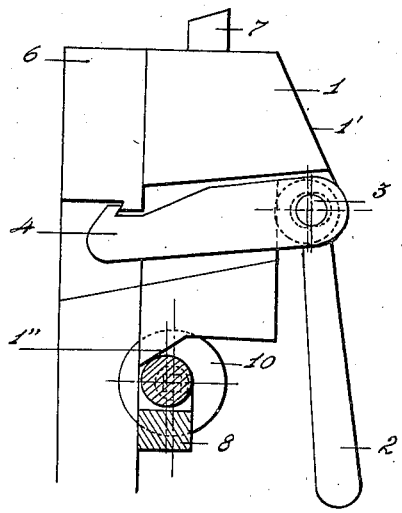
INVENTOR
L. Antonelli
BY C. F. Wenderoth
ATTORNEY Patented Mar. 4, 1941

2,234,103

UNITED STATES PATENT OFFICE 2,234,103

APPARATUS FOR CHANGING THE TOOLS IN METALWORKING LATHES

Leonida Antonelli, Padova, Italy

Application February 6, 1939, Serial No. 254,964
In Italy March 1, 1938

1 Claim. (Cl. 82—36)

This invention relates to a method of and apparatus for rapidly and easily changing the tools in metalworking lathes. When lathes of high output are used, more especially those in which a number of tools are in operation at the same time, it is of great importance that stoppages of the machine for the purpose of changing a single tool which has become blunt or otherwise unserviceable in some other way should be of minimum duration.

The method and the apparatus of the invention enable the tools to be set up in advance in a number of spare tool holders. According to the invention, the tools are set up in advance in a number of tool holders, each of which can be connected to and released from the lathe slide by operating a single handle, so that the insertion of a new tool on the tool slide is effected extremely simply and rapidly.

The fine adjustment of the tools in accordance with wear during running may be effected by directly adjusting the tool holder, for example, by rotating an eccentric pin.

In order that the invention may be readily understood and carried into effect a tool holder constructed in accordance with the invention is illustrated by way of example in the accompanying drawing, in which—

Figure 1 is a diagrammatic front elevation of the tool holder fitted on the tool slide.

Figure 2 shows a side elevation on the line A—B and a part section on the line C—D.

Referring to the drawing, the reference 1 denotes the tool holder or tool block, 2 the actuating lever and 3 a shaft which is firmly attached to the lever and on the ends of which are mounted the hooks 4 and 5. The reference 6 denotes the lathe slide, 7 a tool, 8 a bearing fixed on the slide, 9 an eccentric pin, 10 a disc connected to the pin and bearing graduations and 11 is an opening for the insertion of a spanner.

As may be seen from the drawing the tool holder consists of a single block which can be firmly fixed on a seating in the lathe slide 6 by actuating a single lever 2, which acts on the middle of the shaft 3, which carries at each end the hook-shaped lever 4 or 5. The actuating lever 2 is fixed to a shaft having eccentric form at its ends, so that, when the shaft is turned, the hooked levers 4 and 5 are caused to engage projections on the slide 6, whereby the tool holder is pressed against the slide. Since the lever 2 acts on the central part of the shaft which carries the two hooks 4 and 5, the pressure of the tool holder is uniformly distributed over the supporting surface. The hooked levers may be engaged with the projections on the tool slide either by springs or by hand. When a device of this kind is used, the replacement of one tool holder by another tool holder in which the tool has already been set up ready for working is an extremely simple operation which can be effected very rapidly. To the tool slide 6 is fixed a bearing 8 which carries the eccentric pin 9 against which an oblique surface 1″ of the tool holder bears. The fine adjustment of the tool is effected by inserting a spanner in the aperture 11 and turning the pin 9. The disc 10 is preferably provided with a scale so that the amount of adjustment which has been effected may be read off.

When the tool is mounted in the tool-holder 1 the inclined surface 1′ of the latter acts as a registering surface for checking the correct setting relatively to the work.

The advantages of the present invention reside in the simple and rapid exchange of the tool for which only a single lever movement is required and also in the possibility of accurately pre-setting the tool relatively to the work.

What I claim is:

A tool holder for lathes and the like comprising a block, a shaft rotatably mounted in said block having an eccentric portion thereon, a hook-like lever to engage the lathe slide on said eccentric portion, a lever fixed to said shaft for actuating the same to lock and unlock said block to the lathe slide, an oblique surface on said block and an eccentric member on said lathe slide cooperating with said surface for adjusting said tool holder.

LEONIDA ANTONELLI.